April 4, 1950    J. S. MATASY ET AL    2,502,577
FISH LURE
Filed May 4, 1946
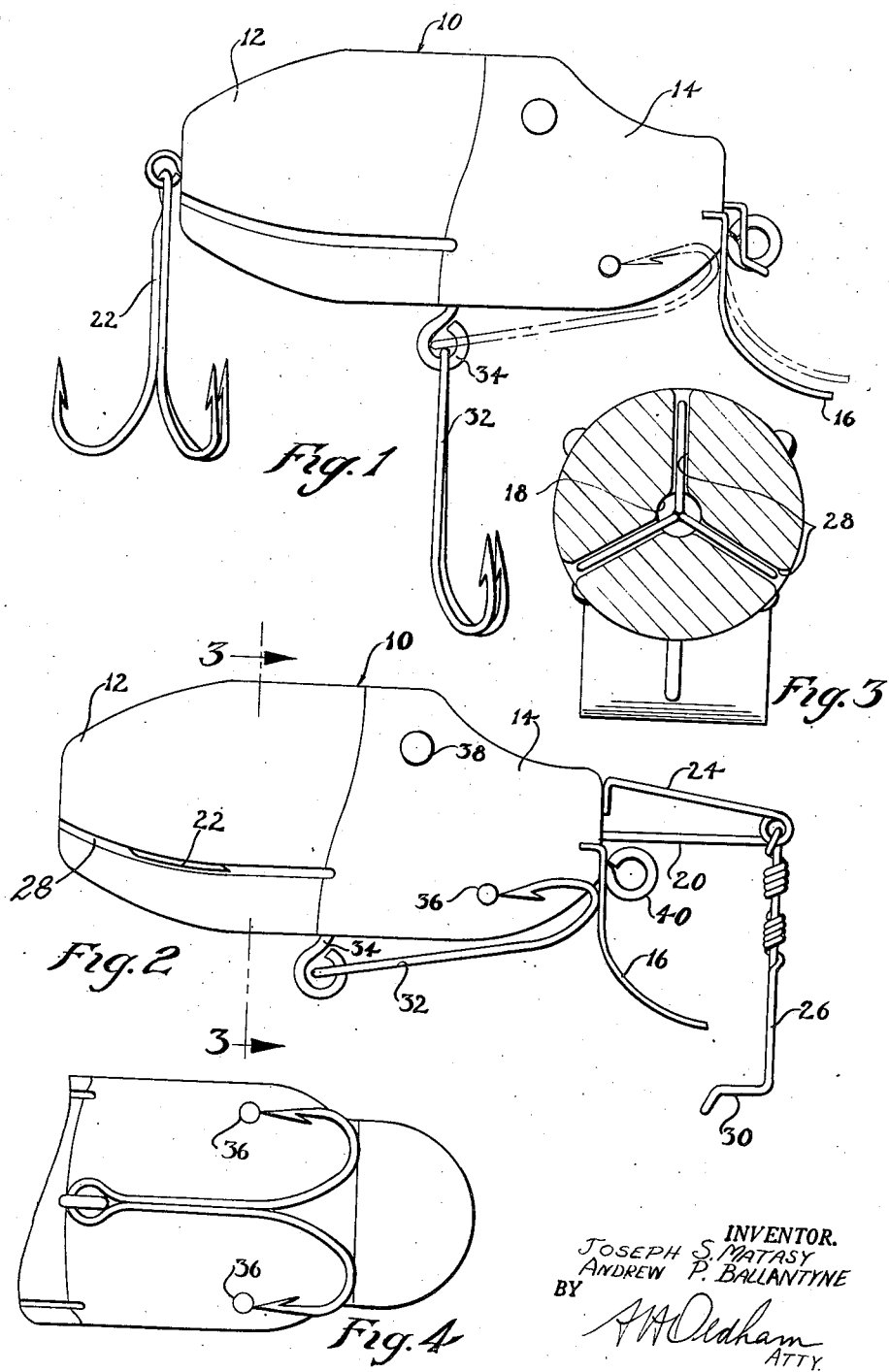

Patented Apr. 4, 1950

2,502,577

UNITED STATES PATENT OFFICE 2,502,577

FISH LURE

Joseph S. Matasy and Andrew P. Ballantyne, Youngstown, Ohio

Application May 4, 1946, Serial No. 667,370

3 Claims. (Cl. 43—42.36)

This invention relates to fishing lures, and, especially, to the type of artificial fish bait or lure used in casting or trolling for fish.

The present invention relates to and is an improvement upon the invention disclosed in our joint Patent No. 2,288,009 entitled "Fishing lure or artificial fishing bait," issued June 30, 1942. This previous patent of ours relates to a fish lure construction which is adapted to position the tail hook of an artificial fish lure in a retracted position when the fish lure is not in use. Such construction permits the fish lure to be stored and handled safely without danger of the tail hook accidentally snagging onto persons or articles and specifically permits the fish lure to be stowed in a fishing tackle box without tangling with other articles in the box. Our previous patent does not provide any means for rendering any but the tail hook or hooks of an artificial fish lure safe from accidental snagging when not in use. Since most artificial fish lures of the class described, have both a forwardly positioned set of hooks as well as a tail set of hooks, it is highly desirable to provide some type of means for positioning the forward set of hooks in an inoperative manner at the same time the tail hooks are rendered safe whereby a completely compact, safe type of fish lure would be provided.

The general object of our invention is to provide an artificial fish lure, usually of the type used in trolling or casting operations, which lure has a plurality of hooks associated with it but which hooks can be readily positioned in a non-operative manner either within, or entirely flush with the surface of the fish lure, when such lure is not in use.

Another object of the invention is to provide an artificial fish lure of a standard construction, and which has excellent fish catching characteristics when in use, with means for retaining the hooks on the lure in non-operative positions, which means are positive acting and must be specially operated to move the hook, or hooks to or from non-operative position.

A further object of our invention is to provide a fish lure which has a downwardly and forwardly extended lip portion on its front end, with a multiple point hook that is pivotally secured to the under surface of the fish lure but which is adapted to be swung up forwardly of the fish lure into contact with the under surface of the fish lure and be retained in such position by the lip on the lure.

Still another object of the invention is to provide a standard type of fish lure with a slight modification whereby the "belly" hook thereon can easily be positioned in a non-operative place and be retained at such place when not in use.

The foregoing, and other objects of our invention which will become apparent as the specification proceeds, are achieved by the provision of an improved lure of the type now to be described. For example the invention may be used with a fish lure of the type disclosed in our above-identified patent and which has a downwardly and then forwardly extended lip formed on the front end thereof, and a retractable tail hook. A second hook or set of hooks is pivotally secured to the lower surface of the fish lure at a point a small distance less than the length of the fish hook from the nearest portion of the lip measured on a radius swung from the pivotal mounting means of the second hook. The fish hook and lip are constructed and arranged for limited springing movement therebetween whereby the hook can be swung up into contact with the fish lure lip and then swung or snapped by the lip into substantially flush arrangement with the surface of the fish lure. The metal lip on the fish lure is then adapted to retain the fish hook in contact with the fish lure body.

For a better understanding of our invention, reference should be had to the accompanying drawings wherein:

Fig. 1 is an elevation of a fish lure embodying the principles of our invention with the lower fish hook being indicated in dotted line in its non-operative position and the possible movement of the lip on the lure also being indicated in dotted line;

Fig. 2 is an elevation, similar to Fig. 1, with both hooks being in non-operative position;

Fig. 3 is a vertical section on line 3—3 of Fig. 2; and

Fig. 4 is a fragmentary bottom plan of the forward portion of the fish lure of Fig. 2.

Referring in detail to the accompanying drawings, there is shown a fish lure having a body portion indicated generally by the numeral 10. The body 10 is preferably made to simulate the general appearance and movement of a minnow or other small fish when pulled through the water, and to this end the body 10 is generally cylindrical in cross section and is formed with a tapered back end 12 and a reduced diameter front end, or head 14. As done in many fish lure constructions, we provide a lip 16 secured to the front end of the head 14 of the fish lure. The lip 16 extends downwardly from the head 14 and is flush with the substantially vertical surface thereof for the initial length of the lip 16 which, after extending below the extremity of the lower body portion, curves outwardly or forwardly with relation to the body 10. This lip 16 is generally made of thin metal, as will be understood, and while stiff, it still is somewhat resilient with relation to the fish lure body so as to be slightly movable with relation thereto. The lip 16 is used to make the movement of the fish lure through the water more life-like in action.

As disclosed in more detail in our above identified patent, the body 10 has a longitudinally extending aperture 18 therethrough and a wire 20 is positioned in this aperture and mounts a gang hook 22 at the tail end of the fish lure.

The forward end of the wire 20 is then doubled back upon itself at 24 which end of the wire 20 may then either be aligned with the main length of the wire 20 and be inserted with such wire in the aperture 18, or else the wire section may be abutted against the head 14 so as to prevent rearward movement of the wire 20 and hook mounted thereby. A connector wire 26 is suitably engaged with the front end of the wire 20 to control the wire's position when it is totally inserted in the aperture 18. The back end 12 of the body of the fish lure is provided with a plurality of circumferentially-spaced slots 28 which are adapted to receive the points and barbs of the hooks comprising the gang hook 22 so that the wire 20, when pulled forwardly of the body 10, can pull the gang hook 22, when properly positioned, into the slots 28. The length of the wires 20, 24 and 26 are so adjusted that when the wire section 24 is out of the body 10, the hook 22 is completely enclosed in the body 10. Then, when the connector wire 26 is entirely within the aperture 18 except for a connector section 30 formed at its front end, the wire 20 is at the rear end of the body 10 and the tail hook 22 is suspended at the back of the body.

The novelty of our present invention resides in the mounting and non-operative position of a gang hook 32 which is secured to the under surface of the body 10 by an eyelet 34. The gang hook 32 is provided with two points or barbs thereon both of which extend forwardly with relation to the body 10 when the hook 32 is normally suspended from the body. Such hook construction, or the reason for such hook construction will be made apparent as the specification proceeds. However, it also is possible to practice the invention with a single hook pivotally secured to the eyelet 34. The hook 32 is secured to the body 10 at a distance slightly less than the overall length of the hook 32 from the nearest portion of the lip 16 when measured on a radius swung about the eyelet 34. Thus, when the hook 32 is swung forwardly with relation to the body 10, the hook, when in a substantially horizontal position, will strike the lip 16 and, normally, will return itself to its proper suspended operative position. However, the hook 32 and lip 16 are provided with slight resiliency therebetween so that either, or both, of such members may yield slightly so that the end of the hook 32 may be snapped by the contacting portion of the lip 16 when it is desired to render the hook 32 non-operative, such as when the lure is to be stored or handled. Then the hook 32 can be moved down into substantially flush or superimposed relationship with the under surface of the head 14 of the body 10. Fig. 2 clearly shows that the non-operative position of the hook 32 places such hook in a slightly upwardly inclined direction so that in such position of the hook 32, there is a sufficient length between the base of the lip 16 and the eyelet 34 that the hook 32 may be received in such position without any strain or stress on it, or the lip 16. However, the hook 32 will strike a portion of the lip 16 when the hook 32 is moved downwardly with relation to the body 10 and the lip or hook must be sprung slightly in order to effect movement of the hook past the confining section of the lip. This construction and arrangement of the hook 32 and lip 16 provides a safe inoperative position for the hook 32 which, once placed therein, will be retained in such position until positively moved from such non-operative position.

In order to protect the points of the hook 32 further against snagging on any object when in non-operative position, suitable means may be provided on the under surface of the head 14 for protecting such points when there adjacent. In this instance, we have shown semi-spherical members 36 secured to the under surface of the head 14 in proper positions for protecting the hook ends when the hook 32 is brought into substantially flush relationship with the head 14. In some instances, it might be desired to provide small recesses in the head 14 for receiving the hook ends and omit the members 36.

The lure of our invention is completed by providing small glass eyes 38 on the forward portion of the head 14 and by provision of an eyelet 40 on the front portion of the head 14 for engagement with a fishing line for control of the fish lure.

Thus, it will be seen that the fish lure of our invention may be used as a conventional fish lure, and has good results while being used for such purpose, but when it is desired to return such fish lure to the tackle box, or to store or handle the fish lure in any manner, the connector wire 26 may be drawn forward to snap the tail hook 22 into engagement with the slots 28 in the fish lure, and the hook 32 can be swung up into engagement with the lip 16 and snapped by it into a non-operative position whereby all of the fish hooks associated with the fish lure are now positioned within the contour of the fish lure body 10 and the fish lure can be safely handled or stored. However, the lure can readily be returned to operative condition by release of the hooks 22 and 32, when desired.

It should be particularly understood that while one best known form of our invention has been illustrated and described that various modifications of the principle of the invention may be employed without departing from the spirit of the invention or the scope of the appended claims. For example, and as already indicated, we may utilize either the spring in the hook or the spring in a resilient lip, or both, to anchor the hook in safe or non-operative position. More specifically, we may utilize the spring in the two gang hook to lock with or snap by a fixed stop or shoulder, such as may be provided in various ways on the body of the lure, usually by a shoulder or groove formed in the body or by a screw eye or tack, or as above described, by the metal lip. Again, the hook may swing from the tail of the bait up over the top of the body to lock in a safe inoperative position there.

What is claimed is:

1. In a fish lure having a substantially rigid lip extending downwardly and forwardly therefrom, a fish hook pivotally secured to the lower surface of the fish lure and adapted to be swung forwardly of the lure so as to bring the point of the hook substantially flush with the surface of the lure, said hook striking a portion of the lip on the lure as it is swung forward and being adapted to be sprung by the lip into substantially full length contact with the lure, and relatively flat knob means on the body of the lure for shielding the point on the hook when it is lying substantially flush with the lure whereby the lure may be freely handled and stored without danger of said hook snagging anything.

2. In a fish lure having a slightly resilient lip extending downwardly and forwardly therefrom, a double point gang hook pivotally secured to the lower surface of the fish lure and adapted to be swung forwardly of the lure so as to bring the points of the hook substantially into contact with the surface of the lure, the curved portions of said hook striking a portion of the lip on the lure as the hook is swung forward and being adapted to be sprung by the lip into substantially full length contact with the lure and to be retained in such position by the lip.

3. In a fish lure having a slightly resilient lip extending downwardly therefrom, a fish hook pivotally secured to the fish lure and adapted to be swung forwardly of the lure so as to bring the point and barb of the hook substantially flush with the lower surface of the lure, said hook striking a portion of the lip on the lure as the hook is swung forward and being adapted to be sprung by the lip by relative movement therebetween into a position substantially flush with the lure and in contact therewith wherein said hook is protected against accidental engagements with any article.

JOSEPH S. MATASY.
ANDREW P. BALLANTYNE.

REFERENCES CITED

The following references are of record in the file of this patent:

UNITED STATES PATENTS

| Number | Name | Date |
|---|---|---|
| 831,831 | Clippinger | Sept. 25, 1906 |
| 966,068 | Williamson | Aug. 2, 1910 |
| 1,268,097 | Crandall | June 4, 1918 |
| 1,341,618 | Medley | May 25, 1920 |
| 1,466,545 | Peterson | Aug. 28, 1923 |
| 1,694,697 | Beidatsch | Dec. 11, 1928 |
| 1,869,111 | McLaughlin | July 26, 1932 |
| 1,981,091 | Clark | Nov. 20, 1934 |
| 2,163,378 | Horvath | June 20, 1939 |
| 2,288,009 | Matasy | June 30, 1942 |
| 2,439,391 | Jobson | Apr. 13, 1948 |